(12) United States Patent
Yang (10) Patent No.: US 7,082,323 B2
(45) Date of Patent: Jul. 25, 2006

(54) MOBILE NAVIGATION DEVICE

(75) Inventor: Hui-Ping Yang, Taoyuan (TW)

(73) Assignee: Speed Tech Corp., Taoyuan (TW)

( * ) Notice: Subject to any disclaimer, the term of this patent is extended or adjusted under 35 U.S.C. 154(b) by 177 days.

(21) Appl. No.: 10/778,140

(22) Filed: Feb. 17, 2004

(65) Prior Publication Data
US 2005/0181842 A1    Aug. 18, 2005

(51) Int. Cl.
*H04M 1/00* (2006.01)
(52) U.S. Cl. ................ 455/575.1; 455/90.3; 455/550.1
(58) Field of Classification Search ............ 200/4, 200/11, 17 R, 18, 5 R, 6 A; 455/575.1, 550.1, 455/90.3
See application file for complete search history.

(56) References Cited
U.S. PATENT DOCUMENTS 6,097,964 A * 8/2000 Nuovo et al. ............. 455/566
6,555,768 B1 * 4/2003 Deruginsky et al. .......... 200/4
6,810,265 B1 * 10/2004 Tochihara ................ 455/550.1
6,862,459 B1 * 3/2005 Sawada et al. ........... 455/550.1

* cited by examiner

Primary Examiner—Joseph Feild
Assistant Examiner—Shantell L. Portis
(74) Attorney, Agent, or Firm—Troxell Law Office, PLLC (57) ABSTRACT

A mobile navigation device including a roller, a support, a plurality of terminals, and a body. The roller including an insulated bushing and a conductive ring. By matching the plurality of protrusions on an inner end surface of the insulated bushing with a plurality of slots on one end of the conductive ring, the conductive ring is plugged inside of the insulated bushing. The support including two braces, wherein each of the braces has a cantilever that is plugged into the conductive ring to sustain the conductive ring and the insulated bushing. The plurality of terminals are plugged into the conductive ring by prestress on the inner surface of the conductive ring, and each terminal extends out of the conductive ring to connect with a default circuit contact. The body includes a plurality of fixture parts and a plurality of raised spots. The whole structure is movable forward, backward, rightward, leftward, and downward.

8 Claims, 9 Drawing Sheets

MOBILE NAVIGATION DEVICE

FIELD OF THE INVENTION

The present invention relates to a mobile navigation device, more particularly, the invention relates to five transmission movements of forward, backward, rightward, leftward, and downward.

DESCRIPTION OF THE PRIOR ART

Accordingly, the U.S. Pat. No. 6,097,964 'navigation key for a handset' shown in FIG. 7, that discloses a roller body. The roller body 20 comprises a shaft 24 at the middle position. A bearing 46 and an encoder unit 59 are between the roller body 20 and the shaft 24. A metallic disc 48 and an outer bushing 53 are between the roller body 20 and the encoder unit 59. And a locking member 45 is set on the outer side of the encoder unit 59. By the above component, a navigation key is constructed to be a communication interface between the user and the electronic system of the mobile handset.

Figure 7:
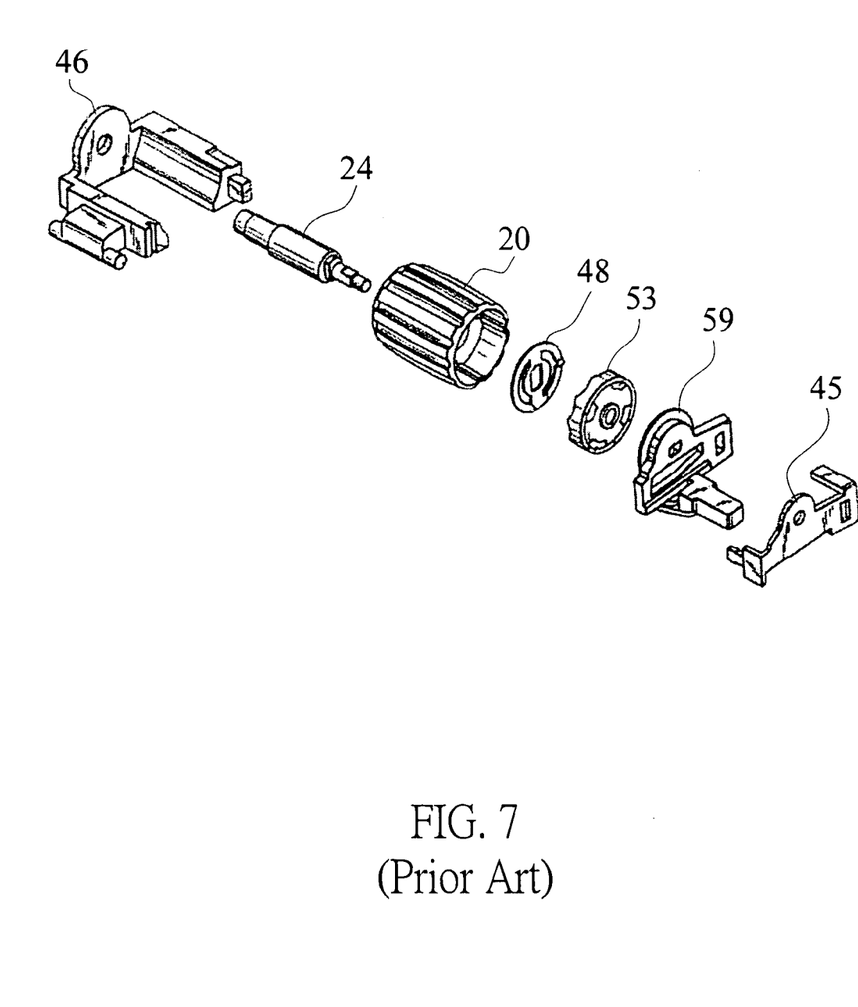
FIG. 7 is an exploded view according to the prior art.

Although the above 'navigation key for a handset' is used as a communication interface between the user and the mobile, as shown in FIG. 7, the structure of the navigation key is complicated, including parts for positioning each other and limiting the sphere of activities. Mobile handset nowadays emphasizes much upon its slightness, thinness, and smallness in size. In order to install a device having such a complicated structure into a mobile handset or other electronic device, some problems will happen concerning the working-hour and the yielding rate of the product.

Figure 8:
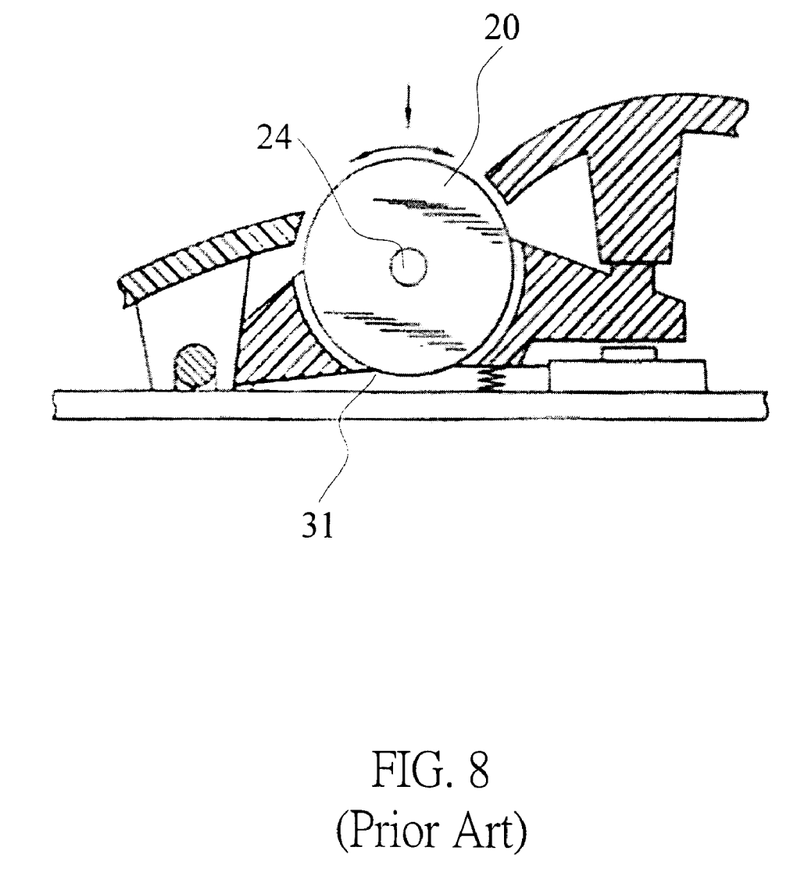
FIG. 8 is a view of the pressing motion according to the prior art.

As shown in FIG. 8, this navigation key can only move forward or backward to choose or be pressed down to confirm, which can only apply to simple electronic device with simple electronic system. Therefore, a navigation device needs to be designed for the electronic device which has complicated electronic system, like multifunctional mobile handset, PDA, Smart Phone, etc., to be the communication interface for the user and the electronic system.

BRIEF SUMMARY OF THE INVENTION

The purpose of present invention is to construct a mobile navigation device comprising simple components of a roller, a support, a plurality of terminals, and a body, and so the structure of the mobile navigation device is simplified.

The purpose of present invention is also to make the mobile navigation device capable of moving in five directions of forward, backward, rightward, leftward and downward to send user's request to the electronic system.

To achieve the above purposes, present invention is a navigation device comprising a roller, a support, a plurality of terminals, and a body. The roller comprises an insulated bushing and a conductive ring both in a shape of hollow ring and one side of the inner surface of the insulated bushing comprises a plurality of protrusions which is corresponding to the plurality of slots on the conductive ring in order to plug the conductive ring into the insulated bushing. The support comprises two corresponding braces, wherein the braces are plugged into the conductive ring in order to sustain the conductive ring and the insulated bushing. The plurality of terminals is plugged in from both ends of the conductive ring producing prestress on the inner surfaces of the both ends of the conductive ring, and is extended out of the conductive ring to connect with default circuit contact. The body comprises a plurality of fixture parts on one of its end surface to fix the support, and a plurality of raised spots on the other end surface to drive circuit switch. Thereof, the navigation device is capable of five transmission movements of forward, backward, rightward, leftward, and downward, and the whole structure of the navigation device is simplified to increase yielding rate of the final products.

BRIEF DESCRIPTION OF THE DRAWINGS

The present invention will be better understood from the following detailed description of preferred embodiments of the invention, taken in conjunction with the accompanying drawings, in which.

DESCRIPTION OF THE PREFERRED EMBODIMENTS

The following descriptions of the preferred embodiments are provided to understand the features and the structures of the present invention.

Figure 1:
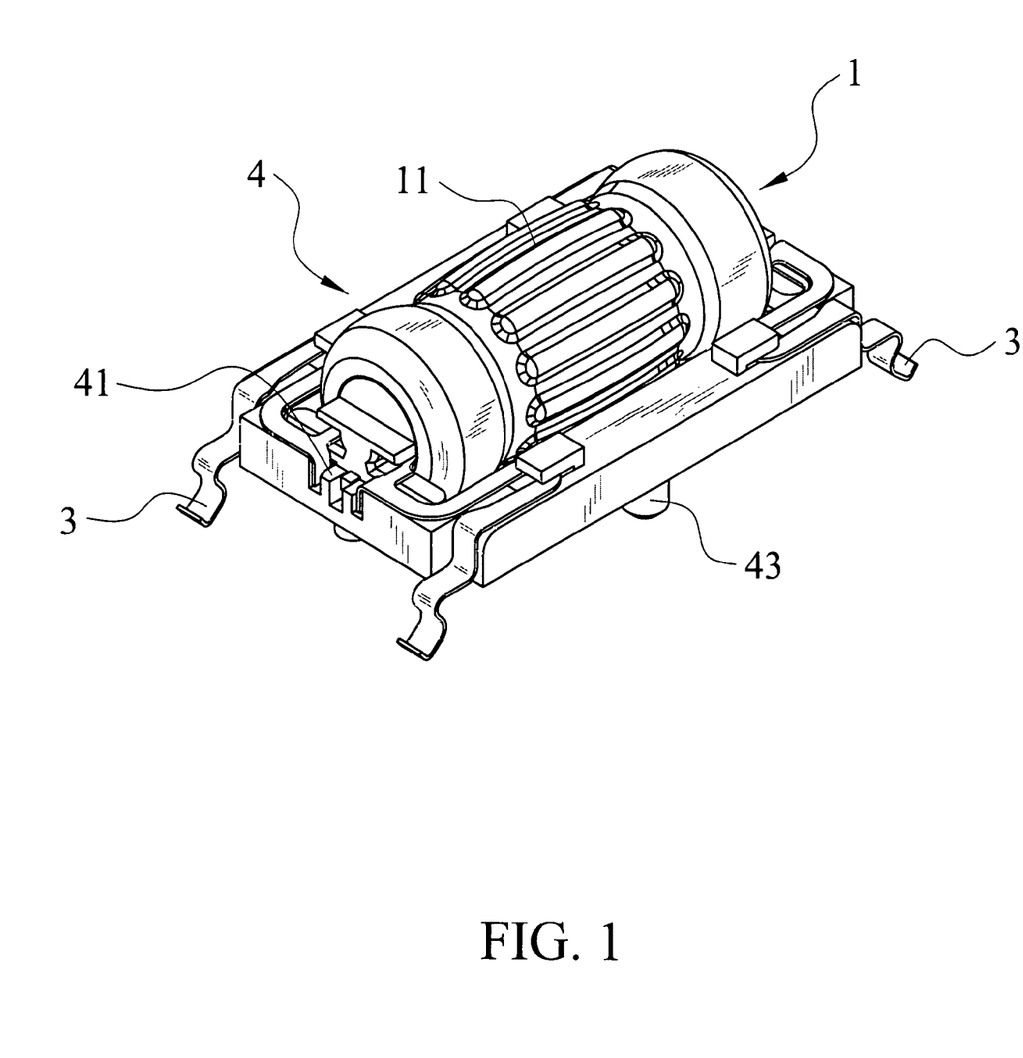
FIG. 1 is a perspective view according to the present invention.
Figure 2:
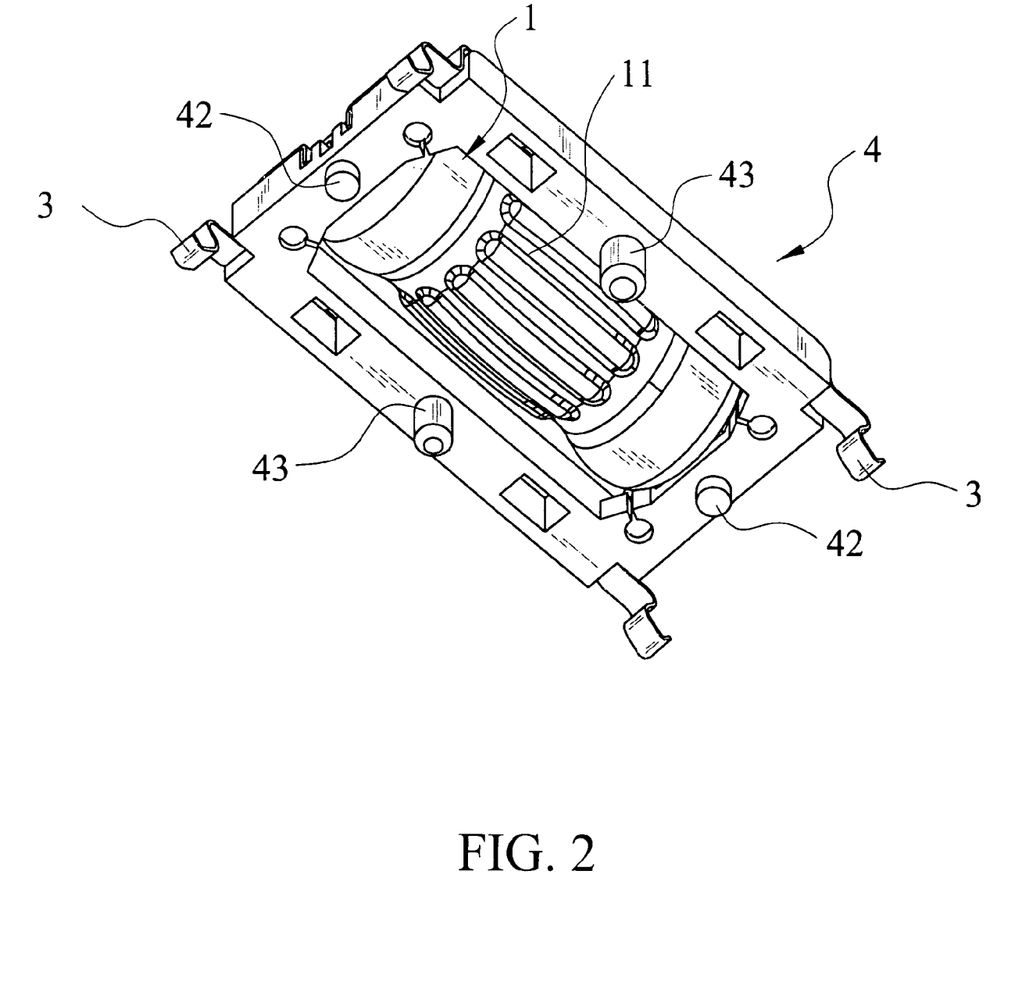
FIG. 2 is another perspective view according to the present invention.
Figure 6:
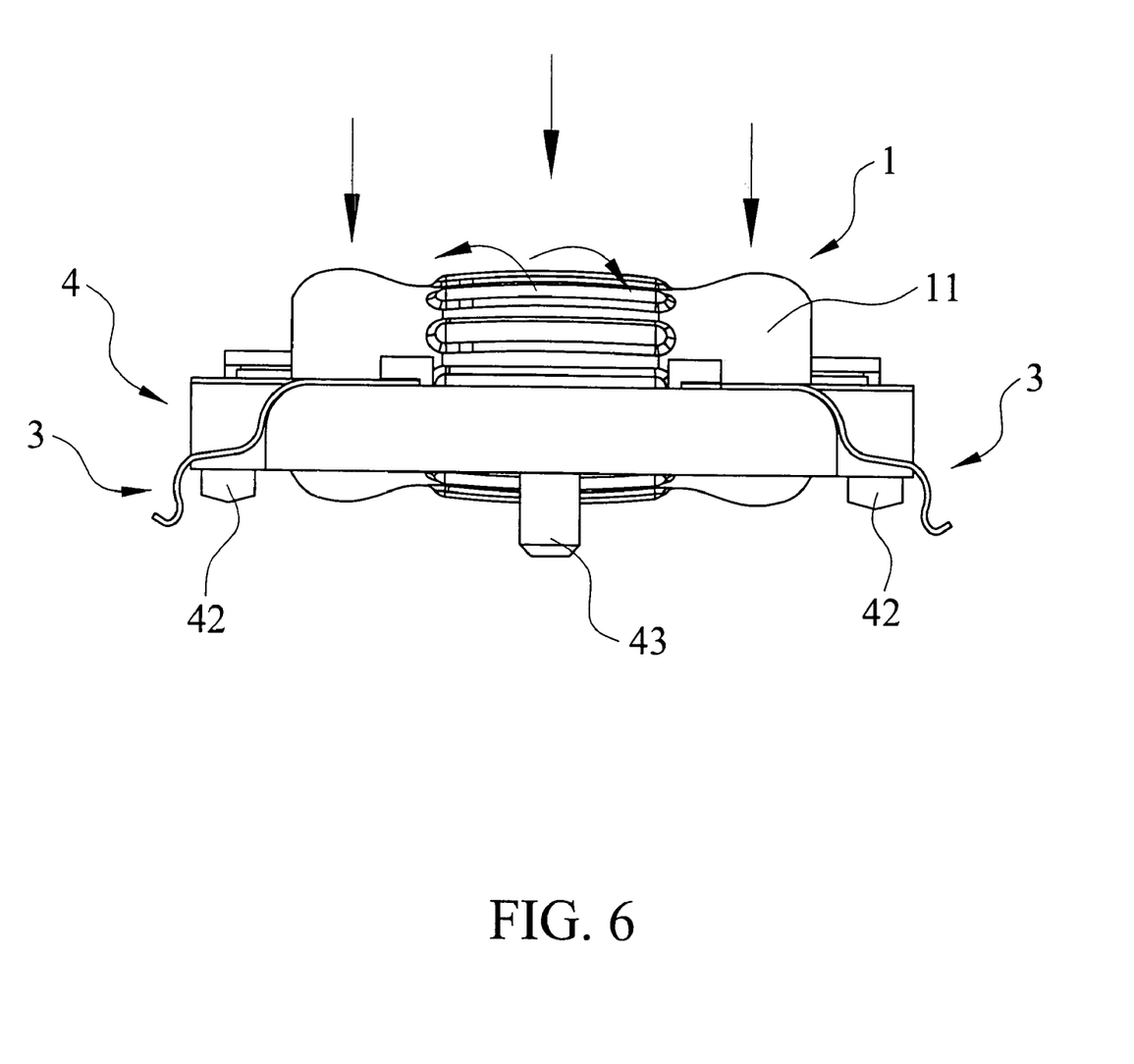
FIG. 6 is a view of the pressing motion according to the present invention.

Please refer to FIG. 1 till FIG. 6, which are views of the preferred embodiment according to present invention. Present invention is a mobile navigation device comprising a roller 1, a support 2, a plurality of terminals 3, and a body 4, and is used as a communication interface between a user and the built-in electronic system of an electronic device. The whole structure of the navigation device is so simplified according to present invention. And the mobile navigation device is capable of five transmission movements of forward, backward, rightward, leftward, and downward, with the roller 1, the support 2, the plurality of terminals 3, and the body 4. In addition, these simple-structured components of the navigation device can help to increase yielding rate of the final products.

The roller 1 of the present invention comprises an insulated bushing 11 and a conductive ring 12, wherein the insulated bushing 11 and the conductive ring 12 are both in a shape of hollow ring that the inner surface of the insulated bushing 11 is made with insulating material and the conductive ring 12 is a metal conductor. The inner surface of the insulated bushing 11 comprises a plurality of protrusions 111 and the conductive ring 12 comprises a plurality of slots 121 in one end correspondingly. The conductive ring 12 is plugged inside of the insulated bushing 11 by matching the protrusions 111 of the insulated bushing 11 and the slots 121 of the conductive ring 12. The protrusions 111 of the insulated bushing 11 and the slots 121 of the conductive ring 12 are correspondingly interfered with each other. To avoid the conductive ring 12 to be untied from the insulated bushing 11 owing to the over usage of the mobile navigation device, an end of the inner surface of the insulated bushing 11 that comprises no protrusion is electively provided with blocks so as to blockade the conductive ring 12 when plugged into the insulated bushing 11.

In this preferred embodiment, the conductive ring 12 is fixedly plugged into the insulated bushing 11 by way of interfering the protrusions 111 of the insulated bushing 11 with the corresponding slots 121 of the conductive ring 12, and so a person skilled in the art can easily figure out a method to mold the conductive ring 12 on the inner surface of the insulated bushing 11 by way of insert molding.

In this preferred embodiment, the support 2 comprises two braces 21,22, wherein each brace 21,22 comprises a cantilever 211,221 that is plugged into the conductive ring 12 to sustain the conductive ring 12 and the insulated bushing 11. In this preferred embodiment, the ends of cantilevers 211,221 butt each other so as to increase the mechanical strength of the cantilevers 211, 221 to resist bending. And the tips of the cantilevers 211,221 butt each other by means of matching concaves with corresponding convexes so as to provide stronger mechanical strength of the cantilevers 211,221 to resist bending.

In this preferred embodiment, the plurality of terminals 3 is plugged into the conductive ring 12 by means of prestress to establish a firm electric connection between the conductive ring 12 and the plurality of terminals 3. At least a pair of the terminals 3 are plugged into the conductive ring 12 at the depth no deeper than the bottom of the slot 121 of the conductive ring 12, and the other terminals 3 are electrically connected with the conductive ring 12 apart from the slots 121, and each terminal 3 extends out of the conductive ring 12 to connect with default circuit contact (which is not shown in the figures.)

Because the inner surface of the insulated bushing 11 is made of insulating materials and the conductive ring 12 is a metal conductor, when the user is rolling the insulated bushing 11, the conductive ring 12 will roll with the insulated bushing 11; and, the terminals 3 plugged into the conductive ring 12 no deeper than the depth of the slots 121 will sequentially touch the conductor (the conductive ring 12) and the insulator (insulated bushing 11 and protrusion 111) to sense the rolling direction, the speed, and the time of the insulated bushing 11 and the conductive ring 12, and then to send signals to the electronic system.

The terminals 3 can connect with default circuit contact by either way of welding or compacting (non-welding), wherein to fix the terminal 3 on the default circuit contact by way of welding can have the effect of directly fixing the position of the electric connection. But in consideration of the volume of the whole mobile navigation device and the area of the default circuit contact, what is also available is to produce electric connection between the terminal 3 and the default circuit contact by way of compacting (non-welding), wherein the terminals 3 and the default circuit are kept in corresponding position by way of indirect connection. The disclosed figures of the preferred embodiment show the way of compacting only. The terminals 3 which are connected with the default circuit contacts are to fix the whole mobile navigation device on the default circuit board, wherein the default circuit board is a soft circuit board. Accordingly, a person skilled in this art can deduce some other substantially equivalent embodiments.

In this preferred embodiment, because the terminals 3 are indirectly connected to the default circuit contact by compacting, when the roller 1 is pressed down with force and so is deformed, the terminals 3 will produce both the wiping motion on the surface of the default circuit contacts as well as the restoration force on the navigation device out of the elastic deformation of the terminals 3. The wiping motion on the default circuit contact made by the terminals 3 has the effect of wiping off the dirt and the oxide on the surface.

The welding method which connects the terminals 3 with the default circuit contacts on the corresponding positions makes the terminals 3 unable to produce wiping motion on the default circuit contacts. But the terminals 3 can connect with the flexible Printed Circuit Board(PCB) with prestress (which is produced when covering the shell or the panel); or the end of the plurality of terminals 3 can be directly welded on the circuit contact to more precisely position the plurality of terminals 3. At the same time, the plurality of terminals 3 on both sides of the roller is fixed on the body to increase the restoration force of the spring arms.

In this preferred embodiment, the upper end surface of the body 4 comprises fixture parts 41 to fix the support 2, wherein the fixture parts 41 are slots that can hold and lock the support 2. Two opposite sides of the other end surface of the body 4 comprise a plurality of raised spots 42, wherein a touchable circuit switch (not shown in the figures) is on the bottom of the plurality of raised spots 42; and a plurality of posts 43 is on the middle of the two opposite sides, wherein the plurality of posts 43 is used only to fix the body 4 on a specific position on the electronic device so as to keep the plurality of raised spots 42 of the body 4 away from the circuit switch.

When the user presses the left side of the insulated bushing 11, the circuit switch under the left raised spot 42 is driven and transfers signals thereafter. When the insulated bushing 11 returns to the original position with the restoration force produced by the plurality of terminals 3, the pressure on the left side of the body 4 is released and so the left raised spot 42 of the body 4 stops driving the circuit switch. And then the mobile navigation device is totally restored to the original state. According to the structure as stated above, a new mobile navigation device is constructed.

In this preferred embodiment, the body 4 can be fixed by the fixture part 41 to the default position on the electronic device which can be a mobile network communication device like a PDA, a mobile handset, or a Smart Phone, etc. (not shown in the figures) After compiling the whole device, the bottoms of the raised spots 42 can be connected with the corresponding positions of the circuit switches on the above communication device, wherein a plurality of terminals 3 reaching out of the conductive ring 12 is connected with the default circuit contact on the above communication device. Because, in this preferred embodiment, the rolling movement of the roller 1 is detected by a plurality of terminals 3, another preferred embodiment can be figured out to detect the regular turn or reversed turn of the roller 1, wherein the preferred embodiment here can be modified according to common skills by a person skilled in the art and the embodiment here is only an example according the present invention.

Figure 3:
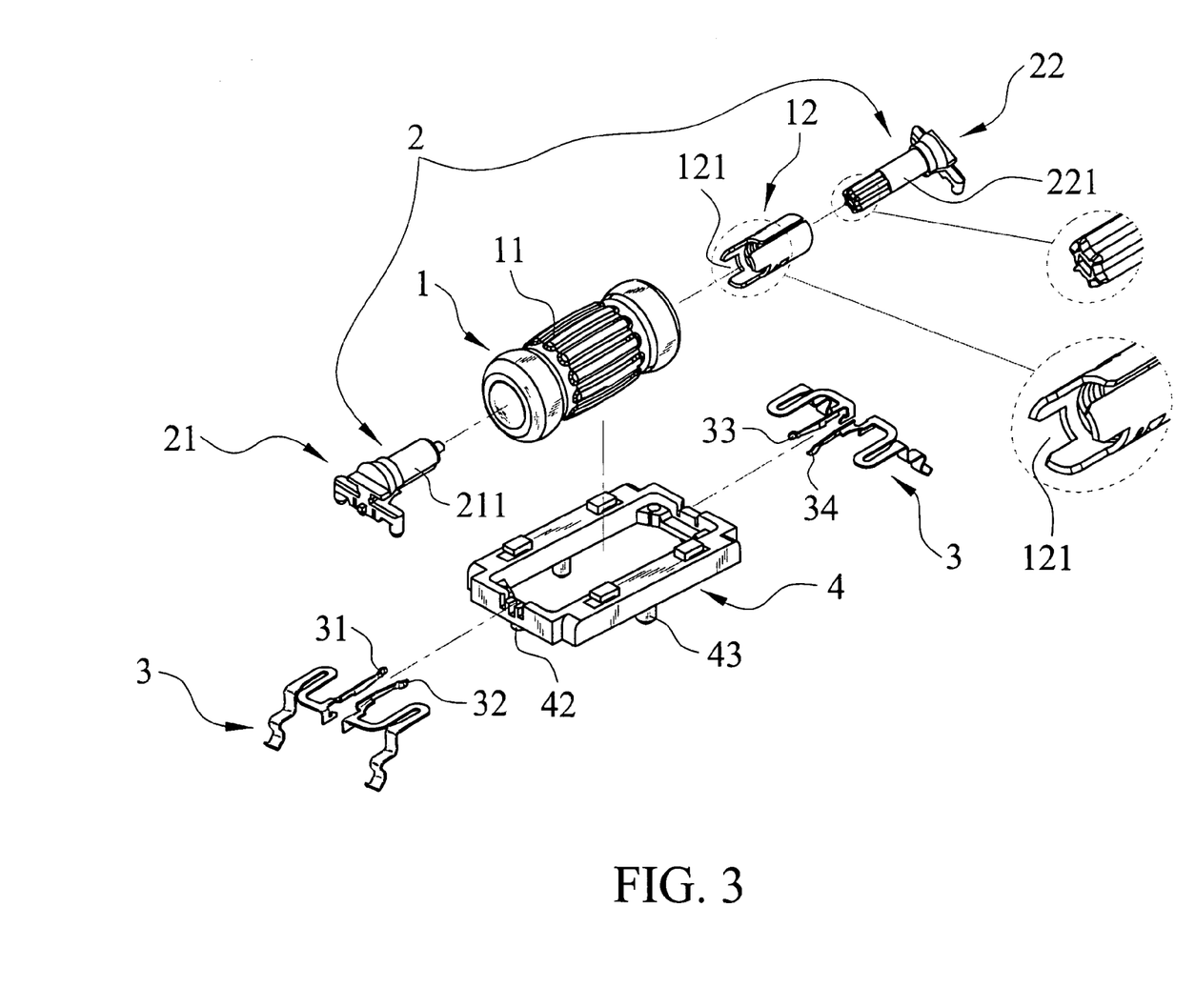
FIG. 3 is an exploded view of the structure according to the present invention.
Figure 4A:
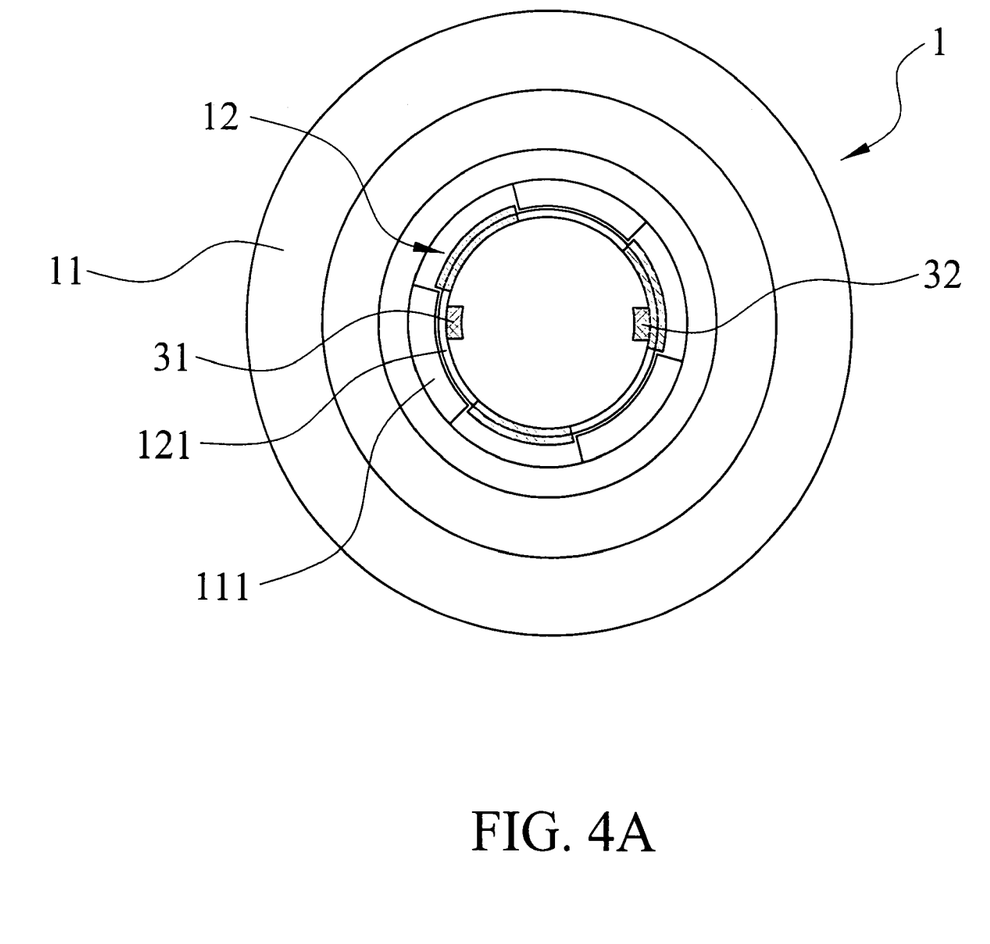
FIG. 4A is a cross-section view of the roller according to the present invention.
Figure 4B:
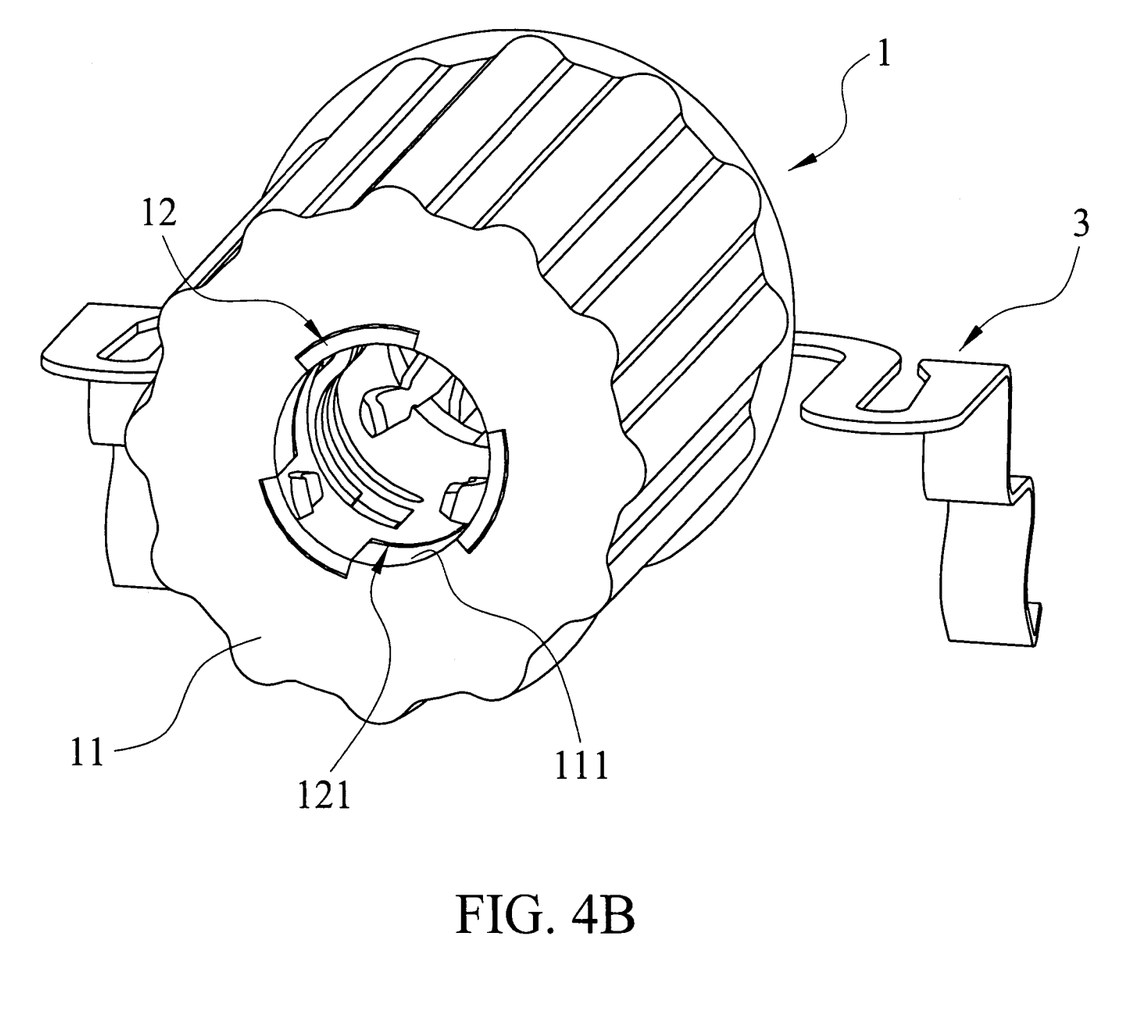
FIG. 4B is a perspective cross-section view of the roller according to the present invention.
Figure 5:
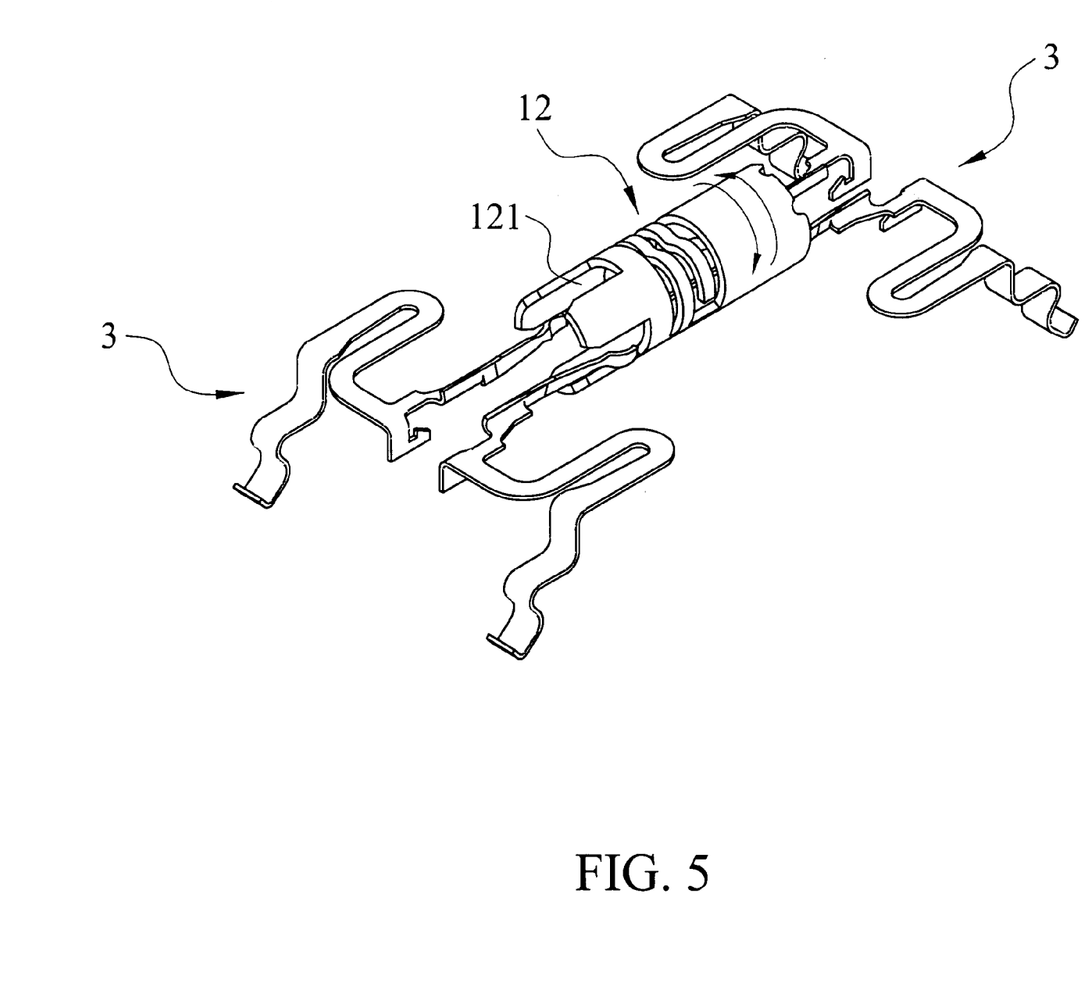
FIG. 5 is a perspective view of the conductive ring and a plurality of terminators according to the present invention.

When the user forwardly or backwardly rolls the device of the preferred embodiment (choose to go up or down), as shown in FIG. 3 and FIG. 4A, the insulated bushing 11 of the roller 1 pushes the conductive ring 12 by the support 2 to roll on the body 1. At the moment, the inner surface of the conductive ring 12 connects permanently with the contactors 33, 34 of the plurality of terminals 3, but the contactor 31 of the terminals 3 on the other side of the conductive ring 12 is on the corresponding position of the slot 121 of the conductive ring 12 (i.e. the protrusion 111 of the insulated bushing 11) wherein the conductive ring 12 is not connected with the contractor 31. Accordingly, when the insulated bushing 11 rolls forward, the originally connected contactor 32 of the terminals 3 moves to the position of the slots 121 of the conductive ring 12 (i.e. the protrusion 111 of the insulated bushing 11) and become disconnected, wherein the originally disconnected contactor 31 of the terminals 3 is connected with the inner surface of the conductive ring 12 because of the rolling movement. Thereof, the signal sent by the latter connected contactor 31 of the terminals 3 comes later than that sent by the former connected contactor 32 of the terminal 3. And by way of logical judgments, the electronic system can differentiate the forward or backward rolling movement.

When the user presses down the right side or the left side of the insulated bushing 11, a pressure force is produced by the roller 1 on the body 4, wherein the post 42 of the body 4 on the corresponding side is pressed down on the elastic press button and turn on the switch on the default circuit board to sent a signal to be read by the electronic system. Simultaneously, a plurality of terminals 3 is elastically deformed owing to the pressure force. When the pressure force is removed, the restoration force provided by the spring arms restores the roller 1, the terminals 3 and the body 4 to the original positions.

When the user presses down on the middle of the insulated bushing 11, a pressure force is produced by the roller 1 on the body 4, wherein the posts 42 of the body are pressed down on the elastic press button either simultaneously or with a minimal time delay in between, and so turn on the switch on the default circuit board that the electronic system can read the signal sent and recognized as another kind of input signal. At the same time, the restoration force provided by the spring arms restores the roller, the terminals and the body to the original positions.

The preferred embodiments herein disclosed are not intended to limit the scope of the invention. Therefore, simple modifications or variations belonging to the equivalent of the scope of the claims and the instructions disclosed herein for a patent are all within the scope of the present invention.

What is claimed is:

1. A mobile navigation device comprising:
   (1) a roller comprising an insulated bushing and a conductive ring, wherein said insulated bushing and said conductive ring are in a shape of hollow ring, and one side of an inner surface of said insulated bushing comprises a plurality of protrusions and said conductive ring comprises a plurality of slots, and said plurality of slots on said conductive ring is corresponding to said plurality of protrusions on one side of inner surface of said insulated bushing to plug said conductive ring into said insulating bushing;
   (2) a support comprising two braces, wherein said braces comprise a corresponding cantilever for each, and said cantilevers are plugged into said conductive ring to sustain said conductive ring and said insulated bushing;
   (3) a plurality of terminals, wherein said plurality of terminals are plugged into said conductive ring producing prestress on the inner surface and at least a pair of said terminals are plugged into said conductive ring at a depth no deeper than a bottom of said slot, and said plurality of terminals is extended out of said conductive ring to connect with default circuit contact; and
   (4) a body comprising a plurality of fixture parts on one end surface of said body to fix said support, and a plurality of raised spots on two opposite sides of the other end surface of said body.

2. The mobile navigation device according to claim 1, wherein the inner surface of said insulated bushing is provided with blocks to block said conductive ring.

3. The mobile navigation device according to claim 1, wherein said insulated bushing is provided with said plurality of protrusions to wedge said plurality of slots to fix said conductive ring.

4. The mobile navigation device according to claim 1, wherein tips of said cantilevers connect with each other by prestress means.

5. The mobile navigation device according to claim 4, wherein the tips of said cantilevers connect with each other by means of matching concaves with convexes.

6. The mobile navigation device according to claim 1, wherein said plurality of terminals connect with electric board by contacting means.

7. The mobile navigation device according to claim 1, wherein said plurality of terminals connect with electric board by welding means.

8. The mobile navigation device according to claim 1, wherein a plurality of posts is on the middle of the opposite sides of end surface of said body.

* * * * *